United States Patent
Yokomizo et al.

(10) Patent No.: US 6,400,211 B1
(45) Date of Patent: Jun. 4, 2002

(54) DC/DC CONVERTER

(75) Inventors: Ichiro Yokomizo; Sachito Horiuchi; Mayuka Matsumae, all of Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/954,036

(22) Filed: Sep. 18, 2001

(30) Foreign Application Priority Data

Sep. 19, 2000 (JP) ........................................ 2000-283135
Sep. 7, 2001 (JP) ........................................ 2001-271755

(51) Int. Cl.[7] .............................................. G05F 1/10
(52) U.S. Cl. ........................................ 327/536; 330/297
(58) Field of Search ........................... 363/60; 327/536; 330/297, 202

(56) References Cited

U.S. PATENT DOCUMENTS 6,011,440 A * 1/2000 Bell et al. .................... 330/202
6,107,862 A * 8/2000 Mukainakano et al. ..... 327/536

* cited by examiner

*Primary Examiner*—Shawn Riley
(74) *Attorney, Agent, or Firm*—Mattingly, Stanger & Malur, P.C.

(57) ABSTRACT

A DC/DC converter is provided with a DC power source; a reference voltage generating circuit; an amplifier which receives an electric power from the DC power source and outputs an electric power of which voltage is controlled so as to assume a target voltage value by stepping down the voltage of the electric power from the DC power source depending on a difference between the reference voltage and a detection voltage; an oscillation circuit which generates signals having a specific frequency; a voltage boosting circuit which receives the output of the amplifier and the output of the oscillation circuit, causes switching of the output of the amplifier at the specific frequency to charge a first capacitor, and performs voltage boosting by transferring the electric charges-charged in the first capacitor through complementary ON/OFF switching with respect to the former switching into a second capacitor after raising substantially upto n/m time voltage (wherein n>m and n and m are integers equal to or more than 2) and charging the same therewith; and an output voltage detection circuit which generates the detection voltage depending on the output voltage of the boosting circuit, whereby a voltage of substantially n/m times of the target voltage value is generated from the voltage boosting circuit.

15 Claims, 5 Drawing Sheets

DC/DC CONVERTER

BACKGROUND OF THE INVENTION

1. Field of Invention

The present invention relates to a DC/DC converter, and, more specifically, relates to a DC/DC converter which suppresses noise generation during switching in a switched capacitor type DC/DC converter which is used for a battery driven power source circuit for a portable telephone set such as for PHS (Personal Handyphone System) and portable telephone system and a battery driven power source circuit for a portable type electronic device such as an electronic book and a PDA.

2. Background Art

In a conventional electronic device driven by a battery such as the portable telephone set for such as PHS and portable telephone system and the portable type electronic device, a circuit which is driven by a higher voltage than a normal battery voltage is incorporated. For example, an LED element drive circuit used as a back light in a liquid crystal display device and a signal transmission circuit are such examples. In order to operate these sorts of circuits a DC/DC converter for boosting the battery voltage is frequently provided as a power source circuit within these devices.

On the other hand, with regard to these sorts of battery driven electronic devices, a size reduction and light weighting of the devices themselves have been advanced, and the size of power source circuit itself has been reduced and correspondingly a circuit with a low power consumption has been demanded. In response thereto, in these sorts of devices and apparatuses, a DC/DC converter, which transfers charged electric charges to a capacitor by means of a switched capacitor such as a charge pump circuit and boosts up to an n times voltage corresponding to a so called n times voltage rectification, is provided, for example, as a part of an LED element drive circuit and a power source circuit therefor. In these sorts of devices and apparatus, the voltage boosted by such DC/DC converter is further regulated and stabilized at a constant voltage by a regulator to produce an LED drive voltage.. Thereby, a size reduction and a low power consumption of the devices is realized.

Although there are a variety of DC/DC converters of different types, however, in view of the LED element drive circuit in which voltage boosting is performed by making use of such as the charge pump circuit, it has been proposed to utilize a so called switched capacitor type DC/DC converter of which entire power source circuit is also an n times voltage rectification type.

FIG. 5 is an example of such power source circuits.

In FIG. 5, a DC/DC converter 10 includes, regardless to the LED element drive circuit, a charge pump circuit (a double voltage boosting circuit) 12 which performs switching at an oscillating frequency of an oscillation circuit (OSC) 13.

Respective terminals of a capacitor C1 of the charge pump circuit 12 are connected between an input side power source line (a positive electrode side of a lithium ion battery 11) Vin and the ground GND via respective switch circuits SW1 and SW2. Further, the respective terminals of the capacitor C1 are again connected to a charging side terminal of a power output use capacitor C2 and to the input side power source line Vin via respective switch circuits SW3 and SW4.

The charging side terminal of the capacitor C2 is connected to an output terminal Vo and the other terminal of the capacitor C2 is connected to the ground GND.

The DC/DC converter receives from the lithium ion battery 11 an electric power of a voltage of, for example, about 3.6V (usually, a certain voltage in a range of 3.0V–4.2V) and performs a boosting operation by turning ON/OFF the switch circuits SW1–SW4 in response to pulses having a predetermined frequency being outputted from the oscillation circuit (OSC) 13.

Namely, the DC/DC converter 10 turns ON the switch circuits SW1 and SW2 and OFF the switch circuits SW3 and SW4 to charge the capacitor C1 (a first capacitor), further performs a complementary switching (switching of reversing ON/OFF state of the respective switch circuits) of turning OFF the switch circuits SW1 and SW2 and ON the switch circuits SW3 and SW4 to transfer the electric charges having been charged in the capacitor C1 to the power output use capacitor. C2 (a second capacitor) after boosting substantially to doubled voltage and to charge the same.

As a result, the DC/DC converter repeats a so called double voltage rectification and generates a voltage of about 7.2V at the capacitor C2. Further, the switch circuits SW1–SW4 receive output pulses from the oscillation circuit 13 and are turned ON/OFF in response to High level thereof (hereinbelow, will be referred to as "H") and Low level thereof (hereinbelow, will be referred to as "L"). Since the switch circuits SW3 and SW4 receive the output pulses from the oscillation circuit 13 via an inverter, the switch circuit SW3 and SW4 perform the complementary switching operation with respect to the switching circuit SW1 and SW2.

The oscillation circuit 13 performs oscillation upon receipt of electric power from the lithium ion battery 11 and outputs pulses of 50% duty ratio having a predetermined frequency to the charge pump circuit 12. Then, the DC/DC converter detects the voltage Vo at the output side which is boosted by the charge pump circuit 12 at an output voltage detection circuit 14 to feed back the same to the oscillation circuit 13 and controls the oscillation frequency of the oscillation circuit 13 so that the output voltage Vo is kept at a constant voltage.

However, in such switched capacitor type DC/DC converter, since the capacitor C1 is connected to the input side power source line Vin at the time of ON/OFF switching of the switches, noises with a high level are induced on the input side power source line Vin at the time of switching the switches. Further, in order to stabilize the output voltage Vo the oscillation frequency of the oscillation circuit 13 is controlled in which when the output voltage Vo rises, in order to lower the same the switching of the switches is performed before completing charging of the capacitor C1, therefore, noises are also induced on the output line of the output voltage Vo.

Such noises reduces electric power conversion efficiency as well as causes adverse effects to the surrounding circuits. In particular, since the frequency of the oscillation circuit varies, the frequency of the noises likely varies which makes difficult to remove the noises by a filter. Especially, such is problematic to battery driven portable type electronic devices and apparatuses.

SUMMARY OF THE INVENTION

An object of the present invention is to resolve the above problems in the conventional art and to provide a DC/DC converter which can suppress noises induced at the time of switching.

A DC/DC converter of a first aspect of the present invention which achieves the above object is characterized in that, the DC/DC converter comprises a DC power source;

a reference voltage generating circuit; an amplifier which receives an electric power from the DC power source and outputs an electric power of which voltage is controlled so as to assume a target voltage value by stepping down the voltage of the electric power from the DC power source depending on a difference between the reference voltage and a detection voltage; an oscillation circuit which generates signals having a specific frequency; a voltage boosting circuit which receives the output of the amplifier and the output of the oscillation circuit, causes switching of the; output of the amplifier at the specific frequency to charge a first capacitor, and performs voltage boosting by transferring the electric charges charged in the first capacitor through complementary ON/OFF switching with respect to the former switching into a second capacitor after raising substantially upto n/m time voltage (wherein n>m and n and m are integers equal to or more than 2) and charging the same therewith; and an output voltage detection circuit which generates the detection voltage depending on the output voltage of the boosting circuit, whereby a voltage of substantially n/m times of the target voltage value is generated from the voltage boosting circuit.

Further, according to a DC/DC converter of a second aspect of the present invention, in place of the reference voltage generating circuit a variable voltage generating circuit is provided and in place of the output voltage detection circuit a voltage control circuit is provided which controls the variable voltage generating circuit depending on the output voltage of the voltage boosting circuit, whereby, the voltage control circuit controls the output voltage of the variable voltage generating circuit depending on the output voltage of the voltage boosting circuit, so that the output voltage of the amplifier assumes the target voltage value and causes the amplifier to generate an electric power having the target voltage value.

As has been explained in the above, according to the first aspect of the present invention, since the output voltage of the voltage boosting circuit is detected, the detected voltage is fed back to the amplifier and the output voltage of the amplifier is controlled so as to assume the target voltage value, the voltage boosting circuit which performs voltage boosting upon receipt of the output voltage of the amplifier can generate an electric power having a voltage of n/m times of the target voltage value. Thereby, the voltage boosting circuit can output an electric power having a stabilized voltage of substantially n/m times with respect to the target voltage value.

In this instance, since the voltage boosting circuit produces the boosted voltage through the switching control with the specific constant frequency, even when the boosted voltage rises above the voltage of n/m times of the target voltage value, the switching change-over during charging in the voltage boosting operation never happens to thereby suppress the noise generation. Moreover, since the switching frequency is kept constant, a circuit which facilitates noise removal in the surrounding circuits can be realized.

As a result, in the switched capacitor type DC/DC converter, the noise generation at the time of switching for voltage boosting can be suppressed.

DESCRIPTION OF THE PREFERRED EMBODIMENTS

Figure 1:
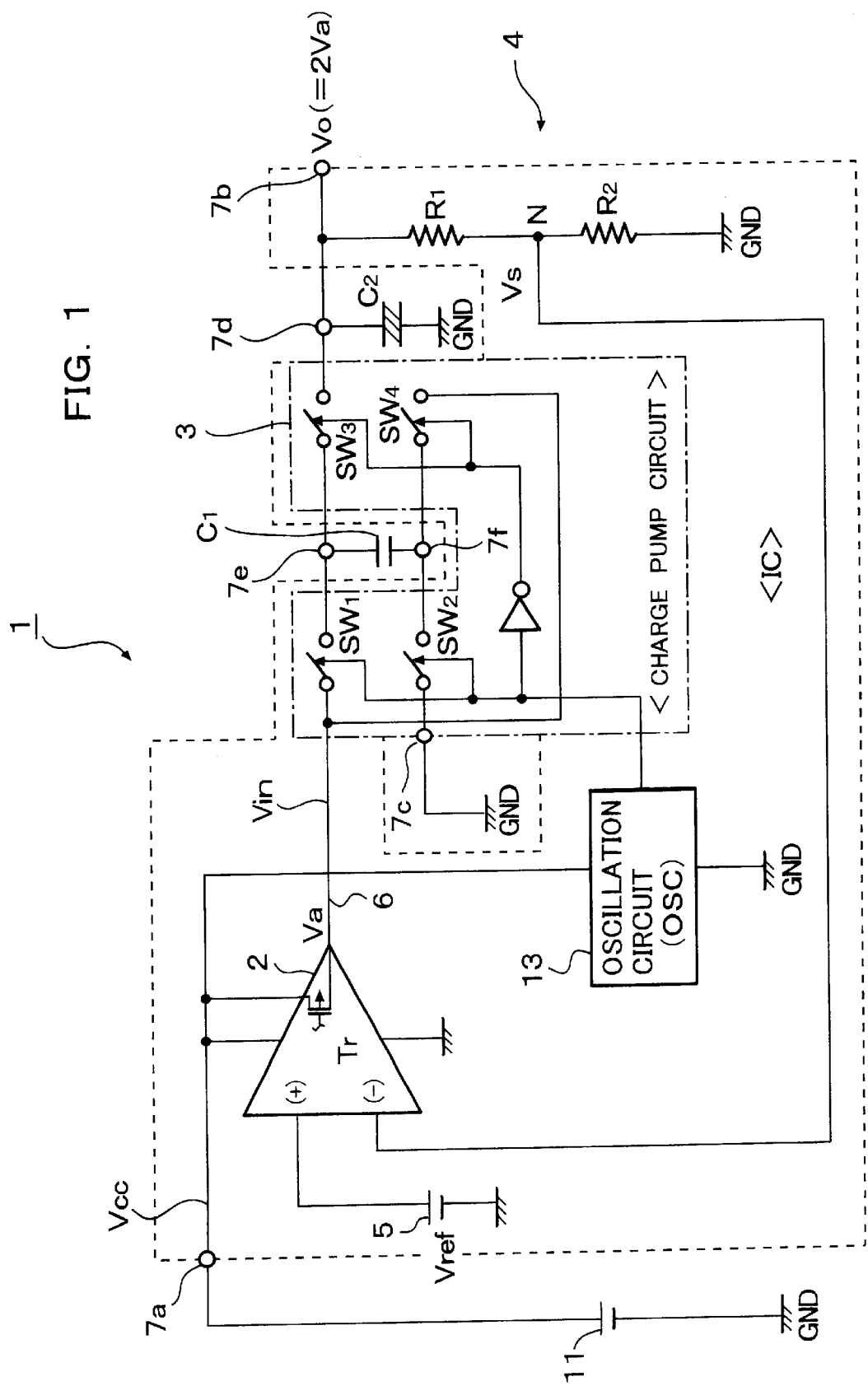
FIG. 1 is a block diagram of a switched capacitor type DC/DC converter representing one embodiment to which a DC/DC converter of the present invention is applied.

In FIG. 1, 1 is a switched capacitor type DC/DC converter in an IC form which is driven by an electric power from a lithium ion battery 11 and includes a power supply use error amplifier 2, a charge pump circuit 3, a resistor voltage divider circuit 4 for output voltage detection and a reference voltage generating circuit 5, and these circuits excluding the battery 11 and capacitors C1 and C2 are formed into a single IC. The portion surrounded by the dotted frame shows the range of the IC and terminals 7a–7f are ones of the IC.

Figure 5:
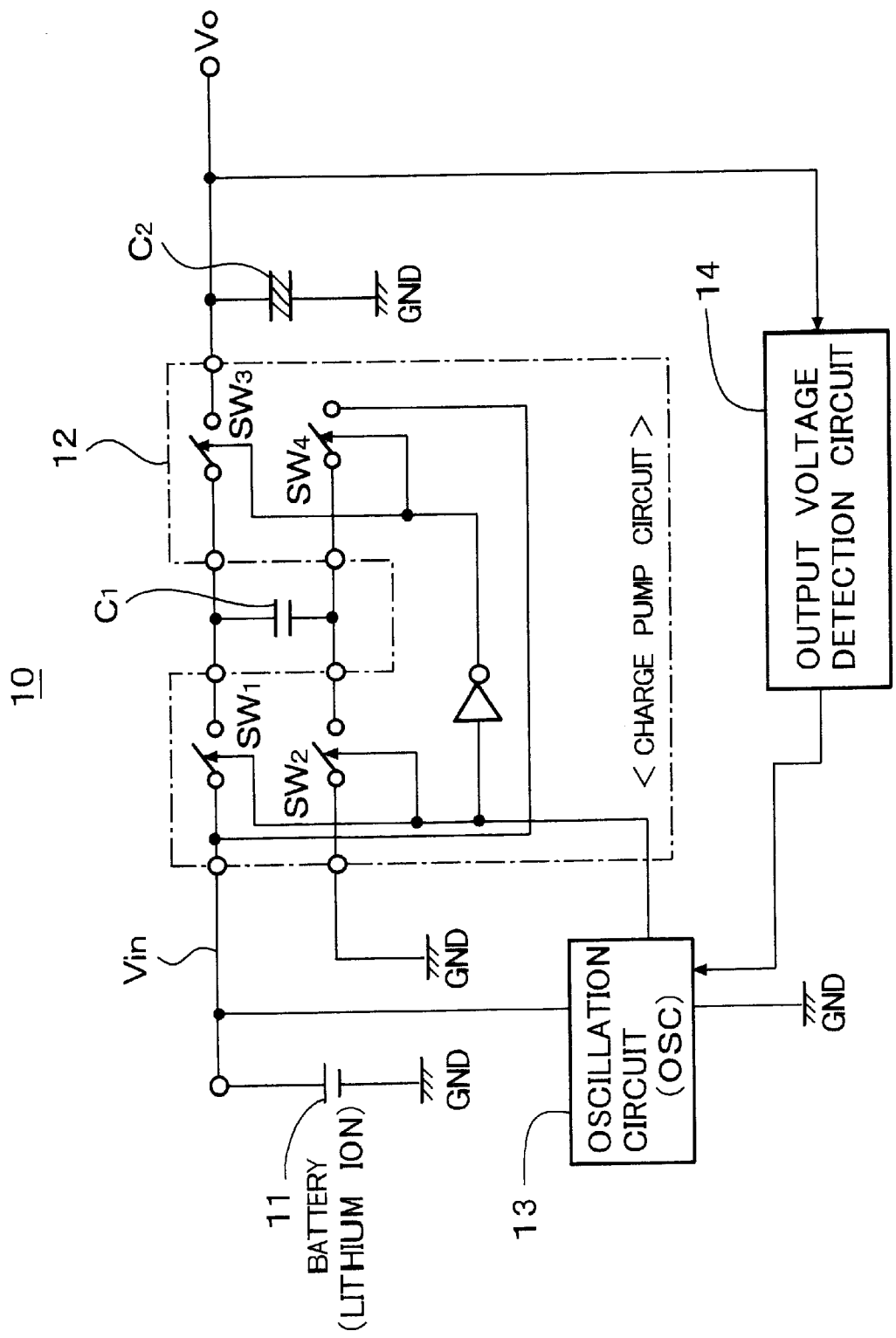
FIG. 5 is a block diagram showing an example of conventional switched capacitor type DC/DC converters.

7a is an input terminal of the DC/DC converter 1, 7b is the output terminal thereof and 7c is the ground terminal thereof. The capacitor C1 is connected between the terminals 7e and 7f and the power output use capacitor C2 is connected between the terminal 7d and the ground GND. Further, the same constitutional elements in FIG. 1 as in FIG. 5 are designated by the same reference numerals as in FIG. 5.

The power supply use error amplifier 2 is an inverted amplifier constituted by a differential amplifier and which receives at the power source line Vcc thereof an electric power from the positive electrode side of the lithium ion battery 11 via the terminal 7a to operate the same, steps down the voltage of the power source line Vcc through an output transistor Tr therein and sends out the output to an output line 6. The power supply use error amplifier 2 compares the detection voltage (a divided voltage) Vs of the resistor divider circuit 4 and the reference voltage Vref of the reference voltage generating circuit 5 and generates an electric power of a voltage for canceling the difference depending on the difference at the output line 6.

Further, the voltage of the output line 6 is in a range lower than the voltage Vcc of the power source line Vcc (which corresponds to the voltage of the lithium ion battery 11) by about 0.4V–1.5V and is herein determined as the target voltage value Va.

For example, when assuming that the voltage of the lithium ion battery 11 is 3.6V (a certain voltage in a range of 3.0V–4.2V) and the target voltage Va is 3.2V, the power supply use error amplifier 2 steps down the voltage of the power source Vcc by about 0.4V by means of the output transistor Tr and performs a control so that when the voltage Vs coincides with the reference output voltage Vref, the output voltage thereof assumes the target voltage Va of 3.2V. Further, for example, when assuming the target voltage Va as 2.5V, the power supply use error amplifier 2 steps down the voltage of the power source line Vcc by about 1.1V by means of the output transistor Tr and performs a control so that when the voltage Vs coincides with the reference voltage Vref, the output voltage assumes the target voltage Va of 2.5V.

The charge pump circuit 3 is a double voltage boosting circuit corresponding to the charge pump circuit 12 as shown in FIG. 5, the input side power source line Vin thereof is connected to the output line 6, the connection change-over (switching) of the capacitors C1 and C2 is performed by the pulses from the oscillation circuit (OSC) 13 like in FIG. 5 and generates the output voltage Vo (=2Va) at the output terminal 7b (or at terminal 7d) after boosting the voltage of the output line 6 upto a double voltage. Further, since the oscillation frequency is not controlled by the oscillation circuit 13, a constant oscillation frequency is given here.

When applying the example where the target voltage Va is assumed as 3.2V, the output voltage assumes 6.4V which is two times of the target voltage Va under the regulation condition. In this instance, the output voltage Vo boosted in double at the output terminal 7b under a normal operating condition falls in a range of about 4.8V–7.2V as a regulation range.

The resistor divider circuit 4 is constituted by resistors R1 and R2 connected in series between the output terminal 7b and the ground GND, and generates the divided voltage (detection voltage) Vs at the junction N of the resistors R1 and R2.

An operation, where the target voltage Va is 3.2V, will be explained, if the voltage of the divider voltage Vs at the junction N is high, the current output voltage of the power supply use error amplifier 2 is higher than the target voltage Va of 3.2V. In this instance, the power supply use error amplifier 2 performs an inverted amplification depending on the difference voltage Vs–Vref from the reference output voltage Vref to increase the internal impedance in the output transistor Tr, generates a reduced voltage at the output line 6 to lower the output voltage Vo to be boosted to double voltage by the charge pump circuit 3 and performs a control to assume Vs=Vref. Thereby, the output voltage Vo is controlled to assume 6.4V, two times of the target voltage.

Contrary thereto, when the voltage of the divided voltage Vs at the junction N is low, the current output voltage of the power supply use error amplifier 2 is lower than the target voltage Va of 3.2V. In this instance, the power supply use error amplifier 2 performs an inverted amplification depending on the difference voltage –(Vref–Vs) from the reference output voltage Vref to decrease the internal impedance in the output transistor Tr, generates a higher voltage at the output line 6 to raise the output voltage Vo to be boosted to double voltage by the charge pump circuit 3 and performs a control to assume Vs=Vref. Thereby, the output voltage Vo is controlled to assume 6.4V, two times of the target voltage.

In the above, the oscillation frequency of the oscillation circuit (OSC) 13 is kept constant and is set to a periodic value in which the change-over timing is determined in such a manner that after completing charging of the capacitor C1 the connection for boosting the terminal voltage of the capacitor C1 is started. Therefore, the charge pump circuit 3 always performs an accurate double voltage boosting operation after completing the charging of the capacitor C1. Thereby, the switching noises induced on the output line of the output voltage Vo are suppressed. Further, the oscillation frequency of the oscillation circuit 13 falls in a range of 300 kHz–700 kHz. When the oscillation frequency is assumed, for example, as 650 kHz, each capacitance of the capacitors C1 and C3 is about 0.22 μF and the capacitance of the output use capacitor C2 is about 1 μF. If the output voltage Vo is selected in a range of 5.0V–6.4V, the output power thereof is about 100 mA.

Further, in the present embodiment as shown in the drawing, the input side power source line Vin of the charge pump circuit 3 is connected not to the positive electrode of the battery 11, but to the output line of the power supply use error amplifier 2 and, in that connected to the positive electrode of the battery 11 via the output stage transistor Tr. Thereby, the noise generation at the input side is also suppressed.

In both instances, since the generated noise frequency corresponds to the oscillation frequency of the oscillation circuit (OSC) 13, the noises in the surrounding circuits are easily removed by a noise removing filter and the surrounding circuits are hardly affected by the noises.

Figure 2:
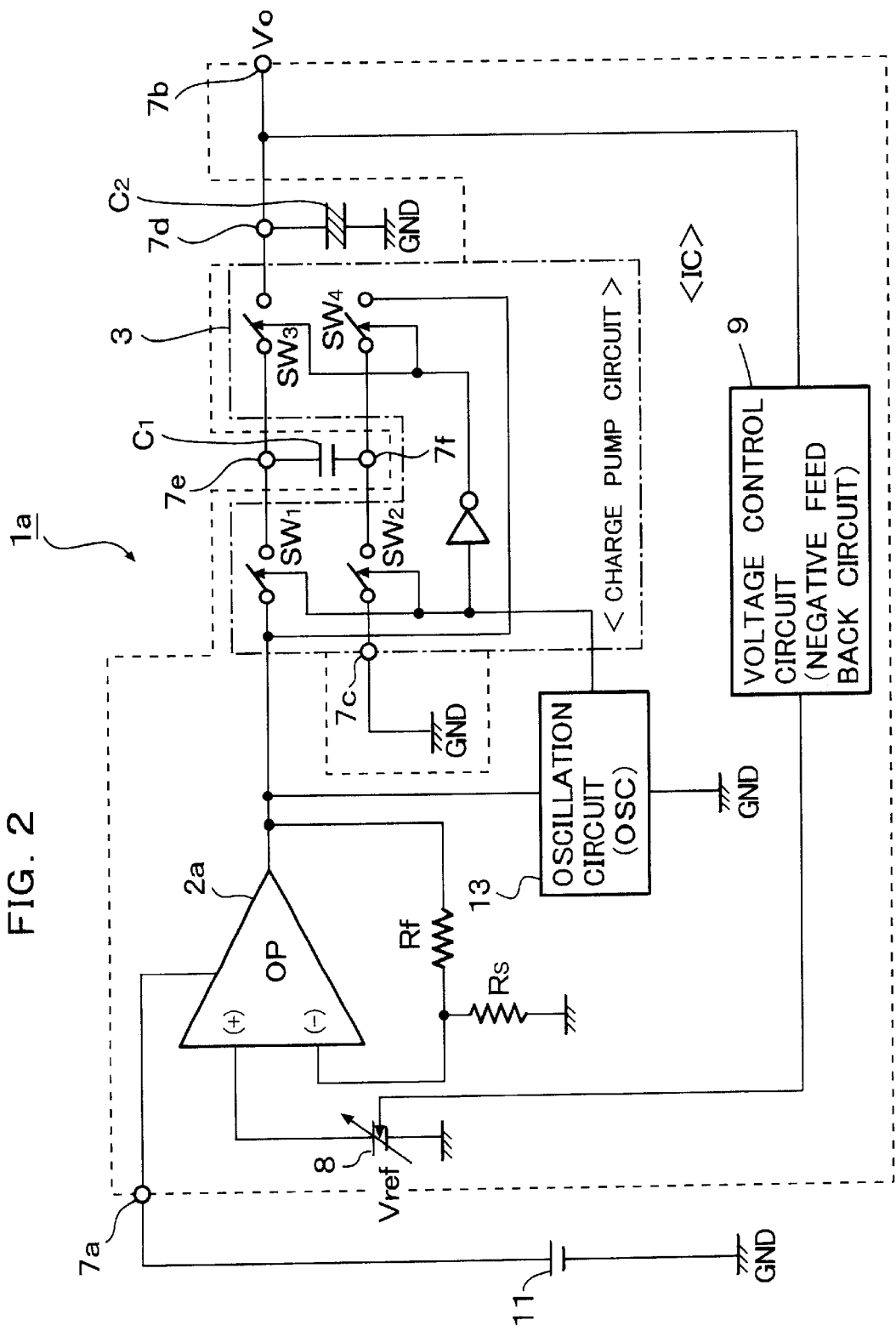
FIG. 2 is a block diagram of another embodiment of a DC/DC converter of the present invention.

FIG. 2 shows a switched capacitor type DC/DC converter 1a representing another embodiment of the present invention, in which in place of the reference voltage generating circuit 5 in FIG. 1 a variable voltage generating circuit 8 is provided, in place of the differential amplifier 2 an operational amplifier (OP) 2a is provided and further, in place of the resistor divider circuit 4 a voltage control circuit (a negative feed back circuit) 9 is provided. Further, in the present embodiment, the electric power for the oscillation circuit 13 is supplied from the output of the operation amplifier (OP) 2a. A resistor Rf and a resistor Rs in the operation amplifier 2a are respectively a feed back resistor and a reference resistor.

With regard to the operation of the present embodiment, the output voltage of the variable voltage generating circuit 8 is controlled by generating a negative feed back control signal (a control signal which suppresses the output voltage Vo when the same rises, and raises the same when drops) which varies the output voltage of the variable voltage generating circuit 8 depending on the output voltage Vo by the voltage control circuit 9. The output voltage is amplified and controlled by the operation amplifier 2a so that the output voltage of the operation amplifier 2a assumes the target voltage value Va. Thereby, the output voltage Vo is stabilized.

In this instance too, the oscillation frequency of the oscillation circuit (OSC) 13 is kept constant and the charge pump circuit 3 always performs an accurate double voltage boosting operation after completing the charging of the capacitor C1.

Figure 3:
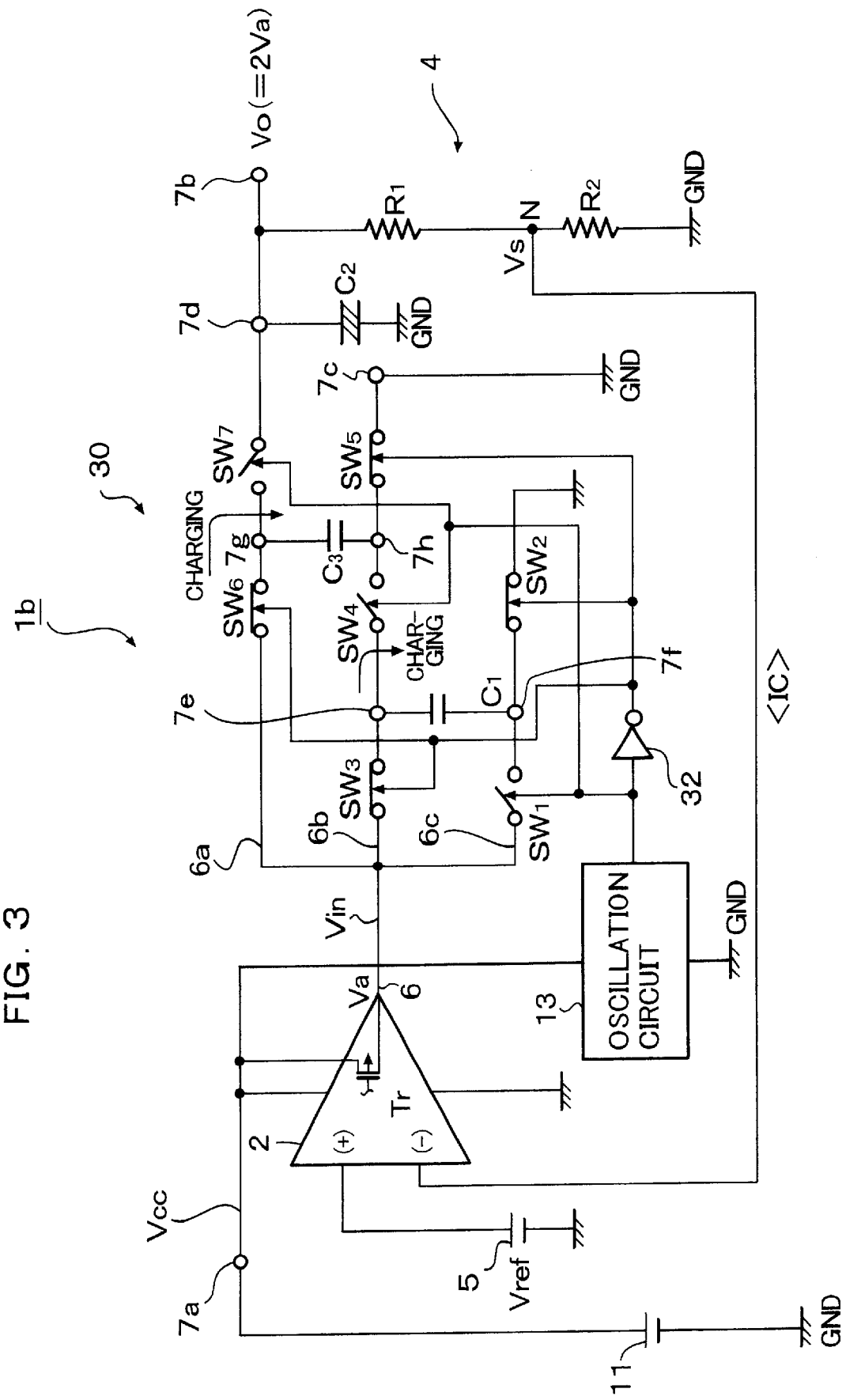
FIG. 3 is a block diagram of one embodiment of a three time voltage boosting DC/DC converter to which the present invention is applied.

FIG. 3 shows a DC/DC converter 1b in which the charge pump 3 in FIG. 1 is replaced by a three time voltage boosting charge pump circuit 30. Like FIG. 1 embodiment, the circuit other than the battery 11 and capacitors C1–C3 are formed into a single IC, however, the dotted line frame indicating the IC region is omitted.

In connection with the three time voltage boosting, a third capacitor C3 is provided which is charged together with the capacitor C1. Further, the charge pump circuit 30 includes seven switches (or switch circuit, the same is true in the following) SW1–SW7, and charges the three capacitors C1–C3 therewith. Further, the capacitor C3 is connected between terminals 7g and 7h.

When explaining specifically, the output line 6 of the power supply use error amplifier 2 is branched into three power lines 6a, 6b and 6c. The capacitor C1 is connected between the power lines 6b and 6c via the respective switches SW3 and SW1. The capacitor C3 is connected between the terminal (terminal 7e) at the side connected to the power line 6b of the capacitor C1 and the power line 6a via the respective switches SW4 and SW6. Further, the terminal (terminal 7h) of the capacitor C3 at the side being connected to the capacitor C1 is connected to the ground GND via the m switch SW5, and the terminal (terminal 7f) of the capacitor C1 at the side being connected to the power line 6c is connected to the ground GND via the switch. SW2.

The terminal (terminal 7d) at the charging side of the capacitor C2 is connected to the terminal (terminal 7g) of the capacitor C3 at the side being connected to the power line 6a via the switch SW7, and the other terminal of the capacitor C2 is connected to the ground GND.

Herein, the switches SW1, SW4 and SW7 perform a complementary switching operation with respect to the switches SW2, SW3 and SW6 by receiving the output pulses from the oscillation circuit 13 via the inverter 32.

In the embodiment circuit, during the interval when the output pulse from the oscillation circuit 13 assumes "H", as illustrated in the drawing, the respective switches SW2, SW3, SW5 and SW6 are turned ON, the respective switches SW1, SW4 and SW5 are turned OFF and the capacitors C1 and C2 are connected in parallel and are charged. During the interval when the output pulse of the oscillation circuit 13 assumes "L", contrary thereto, the respective switches SW2, SW3, SW5 and SW6 are turned OFF, the respective switches SW1, SW4 and SW7 are turned ON and the capacitors C1 and C3 are connected in series to the output line 6 (Vin) and the terminal 7d, further the terminal 7f is connected to the output line 6, thereby, the voltage of the capacitors C1 and C3 is boosted by Vin. As a result, the terminal voltage of the capacitor C3 assumes the three time voltage of Vin and the electric charges thereof are transferred to the capacitor C2.

Figure 4:
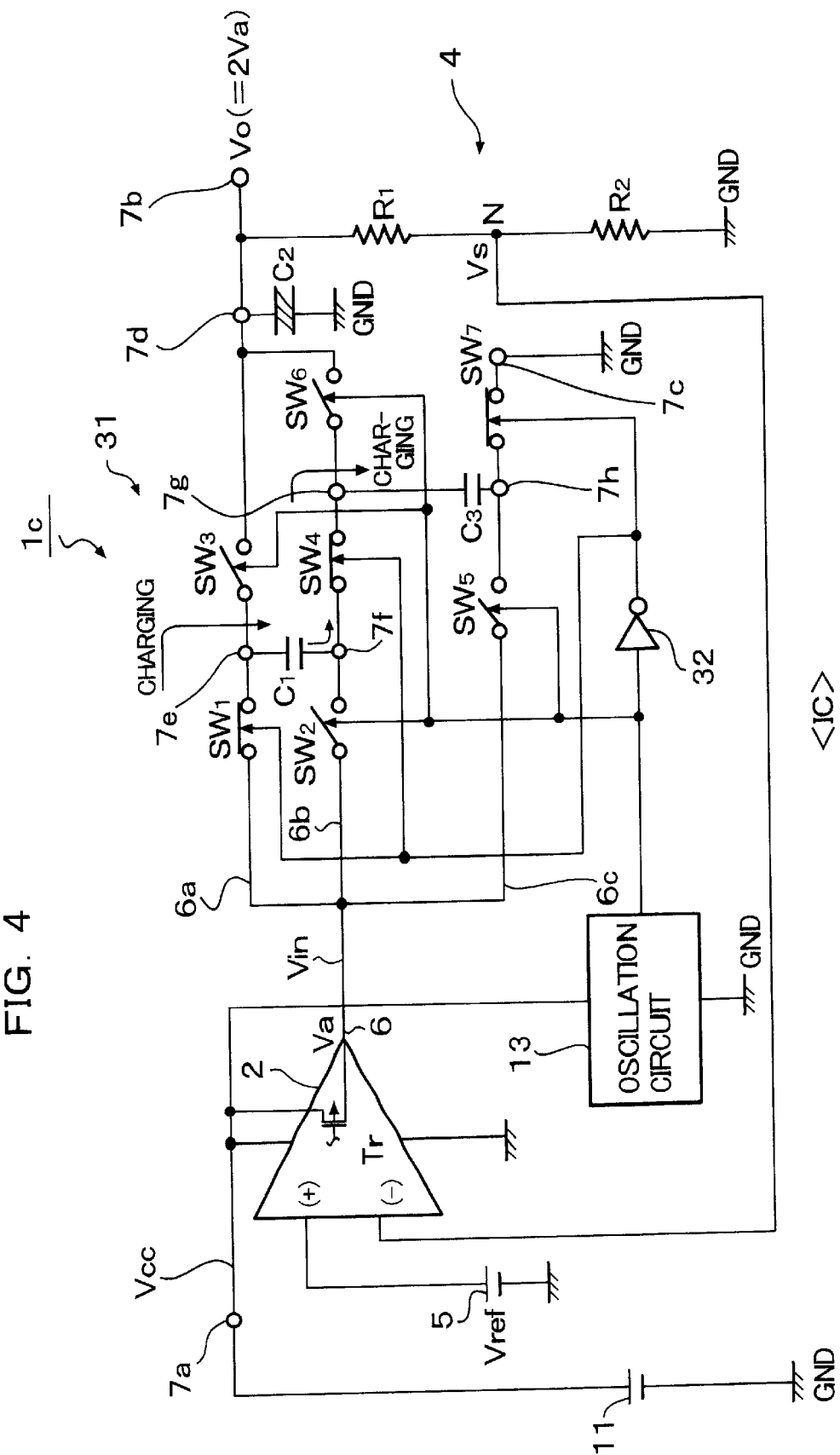
FIG. 4 is a block diagram of one embodiment of 1.5 time voltage boosting DC/DC converter to which the present invention is applied.

FIG. 4 shows a DC/DC converter 1c in which the charge pump circuit 30 in FIG. 3 is replaced by a 1.5 time voltage boosting charge pump 31. Like FIG. 1 embodiment, the circuit other than the battery 11 and capacitors C1–C3 are formed into a single IC, however, the dotted line frame indicating the IC region is omitted.

The charge pump circuit 31, likely, includes seven switches SW1–SW7 and three capacitors C1–C3. However, the connecting condition of the capacitors C1 and C3 is different from that in FIG. 3 embodiment.

Namely, the capacitor C1 is connected between the power lines 6a and 6b via the respective switches SW1 and SW2. The capacitor C3 is connected between the terminal (terminal 7f) of the capacitor C1 at the side being connected to the power line 6b and the power line 6c via the respective switches SW4 and SW5. Further, the terminal (terminal 7g) of the capacitor C3 to which the switch SW4 is connected is connected to the terminal (terminal 7d) at the charging side of the capacitor C2 via the switch SW6, and the terminal (terminal 7h) of the capacitor C3 at the side being connected to the power line 6c is connected to the ground GND. Further, the terminal (terminal 7e) of the capacitor C1 at the side being connected to the power line 6a is connected to the terminal (terminal 7d) at the charging side of the capacitor C2 via the switch SW3.

Like the previous embodiment, the switches SW1, SW4 and SW7 perform a complementary switching operation with respect to the switches SW2, SW3 and SW6 by receiving the output pulses from the oscillation circuit 13 via the inverter 32.

Now, in the present embodiment circuit, during the interval when the output pulse from the oscillation circuit 13 assumes "H", as illustrated in the drawing, the respective switches SW2, SW3, SW5 and SW6 are turned OFF, the respective switches SW1, SW4 and SW5 are turned ON and the capacitors C1 and C2 are connected in series and are charged. During the interval when the output pulse of the oscillation circuit 13 assumes "L", contrary thereto, the respective switches SW2, SW3, SW5 and SW6 are turned ON, the respective switches SW1, SW4 and SW7 are turned OFF and the capacitors C1 and C3 are connected in parallel to the output line 6 (Vin) and the terminal 7d, further the terminals 7f and 7h are connected to the output line 6, thereby, the voltage of the capacitors C1 and C3 is boosted by Vin. As a result, the terminal voltage of the capacitors C1 and C3 assumes the 1.5 time voltage of Vin and the electric charges thereof are transferred to the capacitor C2, and the voltage of the capacitor C2 assumes 1.5 time voltage. Herein, the capacitances of the respective capacitors C1 and C2 are the same.

The above is an embodiment in which the voltage is boosted by adding 0.5 times of Vin, however, in the same manner if n times voltage is added to 0.5 time voltage of Vin, boosted voltage of 2.5 times, 3.5 times . . . can be generated. After obtaining n times voltage (wherein, n is an integer of equal to or more than 3) by connecting two capacitors in series, it is easy to generate n/2 time voltage by connecting these capacitors in parallel. Further, in the above embodiment at first two capacitors are connected in series, thereafter, the connection of the capacitors is changed over to a parallel connection to obtain the voltage Vin/2 with respect to the power source voltage Vin, therefore, in the like manner, at first k pieces (k is an integer equal to or more than 2) of capacitors are connected in series, thereafter, the k pieces of capacitors are connected in parallel to thereby obtain the voltage of Vin/k, and when the voltage Vin is added to the obtained voltage, the boosted voltage Vin(k+1)/k can be generated. Further, if voltage of nVin which is boosted to n times voltage is added to the above boosted voltage, a further boosted voltage can be generated. Further, a boosted voltage of nVin(k+1)/k also can be generated.

As will be understood from the above, voltage boosting to n/m time voltage is generally possible. Wherein n>m and n and m are integers more than 2.

In the embodiments as has been explained hitherto, the use of the lithium battery is exemplified, however, the power source is not limited to the lithium battery, but a power source by means of a ferroelectric capacitor and a power source in which an AC commercial power source is converted into a DC can also be used. In other words, any power sources of DC power source can be applied to the present invention.

What is claimed is:

1. A DC/DC converter characterized in that, the DC/DC converter comprises a DC power source; a reference voltage generating circuit; an amplifier which receives an electric power from the DC power source and outputs an electric power of which voltage is controlled so as to assume a target voltage value by stepping down the voltage of the electric power from the DC power source depending on a difference between the reference voltage and a detection voltage; an oscillation circuit which generates signals having a specific frequency; a voltage boosting circuit which receives the output of the amplifier and the output of the oscillation circuit, causes switching of the output of the amplifier at the specific frequency to charge a first capacitor, and performs voltage boosting by transferring the electric charges charged in the first capacitor through complementary ON/OFF switching with respect to the former switching into a second capacitor after raising substantially upto n/m time voltage (wherein n>m and n and m are integers equal to or more than 2) and charging the same therewith; and an output voltage detection circuit which generates the detection voltage depending on the output voltage of the boosting circuit, whereby a voltage of substantially n/m times of the target voltage value is generated from the voltage boosting circuit.

2. A DC/DC converter of claim 1, wherein the DC power source is a battery, the amplifier is a differential amplifier at the inputs of which the reference voltage and the detection voltage are respectively received, and the boosting circuit includes a charge pump circuit for charging the first and second capacitors.

3. A DC/DC converter of claim 2, wherein the differential amplifier is to perform an inverted amplification, the oscillation circuit is to generate a pulse for the switching operation, the specific frequency is a frequency having a period which permits the complementary switching after substantially completing the charging of the first capacitor, and the differential amplifier, the charge pump circuit, the oscillation circuit, the output voltage detection circuit and the reference voltage generating circuit are formed in an IC.

4. A DC/DC converter of claim 3, wherein the duty ratio of the pulse is substantially 50%, the charge pump circuit includes a plurality of switch circuits which permit selective ON/OFF switching, and the selective ON/OFF switching of the plurality of switch circuits is performed in response to the pulse.

5. A DC/DC converter of claim 4, wherein the charge pump circuit performs the selective ON/OFF switching of the plurality of switch circuits, and after charging the first capacitor by grounding one terminal of the first capacitor and by supplying at the other terminal thereof an electric power from the differential amplifier, the ON/OFF switching of the plurality of switch circuits is inverted, and the one terminal of the first capacitor is connected to the output terminal of the differential amplifier to generate a boosted voltage at the other terminal thereof and to thereby charge the second capacitor.

6. A DC/DC converter of claim 4, further comprises a third capacitor wherein the charge pump circuit performs the selective ON/OFF switching of the plurality of switch circuits to connect the first and third capacitors in series, and after charging the first and third capacitors by grounding one terminal of the series connection and by supplying at the other terminal thereof an electric power from the differential amplifier, the ON/OFF switching of the plurality of switch circuits is inverted, and the one terminal of the series connection circuit is connected to the output terminal of the differential amplifier to generate a substantially three times boosted voltage at the other terminal thereof and to thereby charge the second capacitor.

7. A DC/DC converter of claim 4, further comprises a third capacitor wherein the charge pump circuit performs the selective ON/OFF switching of the plurality of switch circuits to connect the first and third capacitors in series, and after charging the first and third capacitors by grounding one terminal of the series connection and by supplying at the other terminal thereof an electric power from the differential amplifier, the ON/OFF switching of the plurality of switch circuits is inverted, the series connected first and third capacitors are connected in parallel, and the grounded one terminal is connected to the output terminal of the differential amplifier to generate a substantially 1.5 times boosted voltage at the other terminal thereof and to thereby transfer the electric charges in the first and third capacitors to the second capacitor.

8. A DC/DC converter of claim 1, wherein in place of the reference voltage generating circuit a variable voltage generating circuit is provided and in place of the output voltage detection circuit a voltage control circuit is provided, whereby, the voltage control circuit controls the output voltage of the variable voltage generating circuit depending on the output voltage of the voltage boosting circuit so that the output voltage of the amplifier assumes the target voltage value and causes the amplifier to generate an electric power having the target voltage value.

9. A DC/DC converter characterized in that, the DC/DC a converter comprises a DC power source; a variable voltage generating circuit; an amplifier which receives an electric power from the DC power source, amplifies the output voltage of the variable voltage generating circuit and outputs the same; an oscillation circuit which generates signals having a specific frequency; a voltage boosting circuit which receives the output of the amplifier and the output of the oscillation, circuit, causes switching of the output of the amplifier at the specific frequency to charge a first capacitor, and performs voltage boosting by transferring the electric charges charged in the first capacitor through complementary ON/OFF switching with respect to the former switching into a second capacitor after raising substantially upto n/m time voltage (wherein n>m and n and m are integers equal to or more than 2) and charging the same therewith; and a voltage control circuit which controls the output voltage of the variable voltage generating circuit depending on the output voltage of the boosting circuit so that the output voltage of the amplifier assumes the target voltage value, whereby a voltage of substantially n/m times of the target voltage value is generated from the voltage boosting circuit.

10. A DC/DC converter of claim 9, wherein the DC power source is a battery, and the boosting circuit includes a charge pump circuit for charging the first and second capacitors.

11. A DC/DC converter of claim 10, wherein the oscillation circuit is to generate a pulse for the switching operation, the specific frequency is a frequency having a period which permits the complementary switching after substantially completing the charging of the first capacitor, and the amplifier, the charge pump circuit, the oscillation circuit, the voltage control circuit and the variable voltage generating circuit are formed in an IC.

12. A DC/DC converter of claim 11, wherein the duty ratio of the pulse is substantially 50%, the charge pump circuit includes a plurality of switch circuits which permit selective ON/OFF switching, and the selective ON/OFF switching of the plurality of switch circuits is performed in response to the pulse.

13. A DC/DC converter of claim 12, wherein the charge pump circuit performs the selective ON/OFF switching of the plurality of switch circuits, and after charging the first capacitor by grounding one terminal of the first capacitor and by supplying at the other terminal thereof an electric power from the amplifier, the ON/OFF switching of the plurality of switch circuits is inverted, and the one terminal of the first capacitor is connected to the output terminal of the amplifier to generate a boosted voltage at the other terminal thereof and to thereby charge the second capacitor.

14. A DC/DC converter of claim 12, further comprises a third capacitor wherein the charge pump circuit performs the selective ON/OFF switching of the plurality of switch circuits to connect the first and third capacitors in series, and after charging the first and third capacitors by grounding one terminal of the series connection and by supplying at the other terminal thereof an electric power from the amplifier, the ON/OFF switching of the plurality of switch circuits is inverted, and the one terminal of the series connection circuit is connected to the output terminal of the amplifier to generate a substantially three times boosted voltage at the other terminal thereof and to thereby charge the second capacitor.

15. A DC/DC converter of claim 12, further comprises a third capacitor wherein the charge pump circuit performs the selective ON/OFF switching of the plurality of switch circuits to connect the first and third capacitors in series, and after charging the first and third capacitors by grounding one terminal of the series connection and by supplying at the other terminal thereof an electric power from the amplifier, the ON/OFF switching of the plurality of switch circuits is inverted, the series connected first and third capacitors are connected in parallel, and the grounded one terminal is connected to the output terminal of the amplifier to generate a substantially 1.5 times boosted voltage at the other terminal thereof and to thereby transfer the electric charges in the first and third capacitors to the second capacitor.

\* \* \* \* \*